(12) United States Patent
Manssourian

(10) Patent No.: US 10,117,420 B2
(45) Date of Patent: Nov. 6, 2018

(54) ADAPTER FOR RESTRAINING PETS

(71) Applicant: MAAG LLC, Glendale, CA (US)

(72) Inventor: Grigoris Manssourian, Glendale, CA (US)

(*) Notice: Subject to any disclaimer, the term of this patent is extended or adjusted under 35 U.S.C. 154(b) by 104 days.

(21) Appl. No.: 14/967,311

(22) Filed: Dec. 13, 2015

(65) Prior Publication Data
US 2017/0164584 A1 Jun. 15, 2017

(51) Int. Cl.
| A01K 27/00 | (2006.01) |
| B60R 22/10 | (2006.01) |
| B60R 22/18 | (2006.01) |
| A01K 1/02  | (2006.01) |

(52) U.S. Cl.
CPC .......... *A01K 27/005* (2013.01); *A01K 1/0263* (2013.01); *A01K 1/0272* (2013.01); *A01K 27/002* (2013.01); *B60R 22/10* (2013.01); *B60R 22/18* (2013.01); *B60R 2022/1812* (2013.01)

(58) Field of Classification Search
CPC .. A01K 1/0263; A01K 1/0272; A01K 27/002; A01K 27/005; B60R 22/10; B60R 22/18
USPC ................ 119/771, 792, 799, 907; 24/129 B
See application file for complete search history.

(56) References Cited

U.S. PATENT DOCUMENTS

| | | | | |
|---|---|---|---|---|
| 4,023,826 A | * | 5/1977 | Kokubo | A44B 11/2561 24/163 R |
| 4,052,772 A | * | 10/1977 | Tolfsen | B60R 22/24 165/47 |
| 4,102,020 A | * | 7/1978 | Lindblad | B60R 22/1855 24/164 |
| 4,142,274 A | * | 3/1979 | Scholz | B60R 22/24 24/163 R |
| 4,941,434 A | * | 7/1990 | Ellwanger | A01K 27/005 119/771 |
| 5,177,837 A | * | 1/1993 | Rekuc | A44B 11/00 24/198 |
| 5,257,854 A | * | 11/1993 | Korneliussen | B60R 22/02 297/467 |
| 5,432,985 A | * | 7/1995 | Bernart | A44B 11/04 24/200 |
| D361,665 S | * | 8/1995 | Izumi | D3/318 |
| 5,492,084 A | | 2/1996 | Brassington | |
| 5,516,148 A | * | 5/1996 | Ohira | B60R 22/24 280/808 |
| 5,613,467 A | * | 3/1997 | Arakawa | A01K 1/0272 119/771 |

(Continued)

OTHER PUBLICATIONS

New Invention Idea Presented by Invents Company: Dog Leash Concept ; www.invents.com/invention/?page=Dog-Buckle.

(Continued)

*Primary Examiner* — Monica L Williams
*Assistant Examiner* — Brady W Frazier
(74) *Attorney, Agent, or Firm* — Patent Law Agency, LLC; Peter Ganjian

(57) ABSTRACT

An adapter for connecting a pet restraining mechanism with a seatbelt of a vehicle having an elongated opening in a form of a slot that receives a webbing of the seatbelt and a narrow cut in a form of a slit for insertion and removal of the webbing into and from the elongated opening. The adapter also includes an opening for connecting the pet restraining mechanism with adapter.

12 Claims, 18 Drawing Sheets

(56) References Cited

U.S. PATENT DOCUMENTS

| | | | |
|---|---|---|---|
| 5,724,920 A * | 3/1998 | Meisman | A01K 1/0272 |
| | | | 119/771 |
| 5,918,903 A * | 7/1999 | Ito | B60R 22/24 |
| | | | 280/801.1 |
| 6,749,150 B2 * | 6/2004 | Kohlndorfer | B60R 22/18 |
| | | | 242/377 |
| 6,834,621 B1 * | 12/2004 | O'Neill | A01K 1/0272 |
| | | | 119/770 |
| 7,299,527 B1 * | 11/2007 | Gyure | A44B 11/006 |
| | | | 24/198 |
| 7,380,371 B2 * | 6/2008 | Jones | A01G 9/128 |
| | | | 24/129 B |
| 8,281,748 B2 | 10/2012 | Elkins et al. | |
| 8,550,036 B2 | 10/2013 | Morris et al. | |
| 9,162,604 B2 * | 10/2015 | Thurlow | B60P 7/0823 |
| D762,461 S * | 8/2016 | Kirkham | D8/356 |
| 2004/0140660 A1 * | 7/2004 | Xu | B60R 21/02 |
| | | | 280/808 |
| 2005/0126510 A1 | 6/2005 | O'Neill | |
| 2011/0083615 A1 * | 4/2011 | Aaron | A01K 1/0263 |
| | | | 119/771 |
| 2014/0305384 A1 | 10/2014 | Ramirez | |
| 2015/0034020 A1 * | 2/2015 | Santos | B60R 22/10 |
| | | | 119/771 |

OTHER PUBLICATIONS

Car Seat Belt Pet Safety Lead for Dog; Amazon.com ; visited website on Jun. 29, 2018 ; https://www.amazon.com/Seat-Belt-Safety-Lead-Aluminium-alloy/dp/B0759S72Q4/ref=sr_1_71?s=pet-supplies&ie=UTF8&qid=1530259998&sr=1-71&keywords=dog+car+harness.

* cited by examiner

ADAPTER FOR RESTRAINING PETS

BACKGROUND OF THE INVENTION

Field of the Invention

One or more embodiments of the present invention relate to an adapter and, more particularly, to an adapter used with a restraining mechanism and a vehicle seatbelt for restraining pets.

Description of Related Art

Conventional restraining mechanisms for restraining pets while transported in a vehicle are well known and have been in use for a number of years. Regrettably, most are complex to manufacture, cumbersome to use (e.g., have tortuous configurations for insertion/removal of seatbelt), and do not allow for length adjustment of leash and or seatbelt once installed. Further, others do not appropriately secure the pet, or lack an appropriate mechanism to be secured to seatbelt so that it does not inadvertently disengage from the seatbelt. Still others do not allow both the restrained pet and the individual to share the same seatbelt simultaneously. Other conventional restraining mechanism actually require users to manually lock the restraining mechanism with the seatbelt harness even after the restraining mechanism is installed on the seatbelt, placing the life of the pet in danger if the user forgets to manually lock the restrainer.

Accordingly, in light of the current state of the art and the drawbacks to current restraining mechanisms mentioned above, a need exists for a restraining system that would be simple to manufacture and use, and would allow for length adjustment of leash and or seatbelt once installed. Further, a need exists for a restraining system that would appropriately secure a pet, have an appropriate mechanism to be secured to seatbelt so that it does not inadvertently disengage from the seatbelt, and allow both the pet and the individual to share the same seatbelt simultaneously. As importantly, a need exists for a restraining system that would not require the additional step of manually locking the restraining system once the restraining mechanism is installed or mounted on the seatbelt.

BRIEF SUMMARY OF THE INVENTION

A non-limiting, exemplary aspect of an embodiment of the present invention provides a device, comprising:

an adapter for connecting a pet restraining mechanism with a seatbelt of a vehicle;

the adapter is comprised of:

an elongated opening in a form of a slot that receives a webbing of the seatbelt;

a narrow cut in a form of a slit for insertion and removal of the webbing into the elongated opening;

a hole for connecting the pet restraining mechanism with adapter.

Another non-limiting, exemplary aspect of an embodiment of the present invention provides a device, comprising:

an adapter for connecting a pet restraining mechanism with a seatbelt of a vehicle;

the adapter is comprised of:

a first portion for engaging a seatbelt and a second portion for engaging the pet restraining mechanism;

the first portion includes:

an elongated opening in a form of a slot that receives a webbing of the seatbelt; and the second portion includes:

a hole for connecting the pet restraining mechanism.

Another non-limiting, exemplary aspect of an embodiment of the present invention provides a device, comprising:

an adapter for connecting a pet restraining mechanism with a seatbelt of a vehicle;

the adapter is comprised of:

a first portion for engaging a seatbelt and a second portion for engaging the pet restraining mechanism;

the first portion includes:

an elongated opening in a form of a slot that receives a webbing of the seatbelt;

the slot has lateral opening to enable sliding-insertion and removal of a webbing of the seatbelt without folding the webbing;

the lateral opening of the slot includes a gate that allows the sliding-insertion of the webbing of the seatbelt, but not removal thereof; and the second portion includes:

a hole for connecting the pet restraining mechanism.

These and other features and aspects of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" may be used to mean "serving as an example, instance, or illustration," but the absence of the term "exemplary" does not denote a limiting embodiment. Any embodiment described as "exemplary" is not necessarily to be construed as preferred or advantageous over other embodiments. In the drawings, like reference character(s) present corresponding part(s) throughout.

FIGS. 2A-1 to 2D are non-limiting, exemplary illustration of an adapter in use with a conventional seatbelt in accordance with one or more embodiments of the present invention;

FIGS. 4A to 4B-5 are non-limiting, exemplary illustration of an adapter in use with a conventional seatbelt in accordance with one or more embodiments of the present invention.

DETAILED DESCRIPTION OF THE INVENTION

Figures 1, 1A:
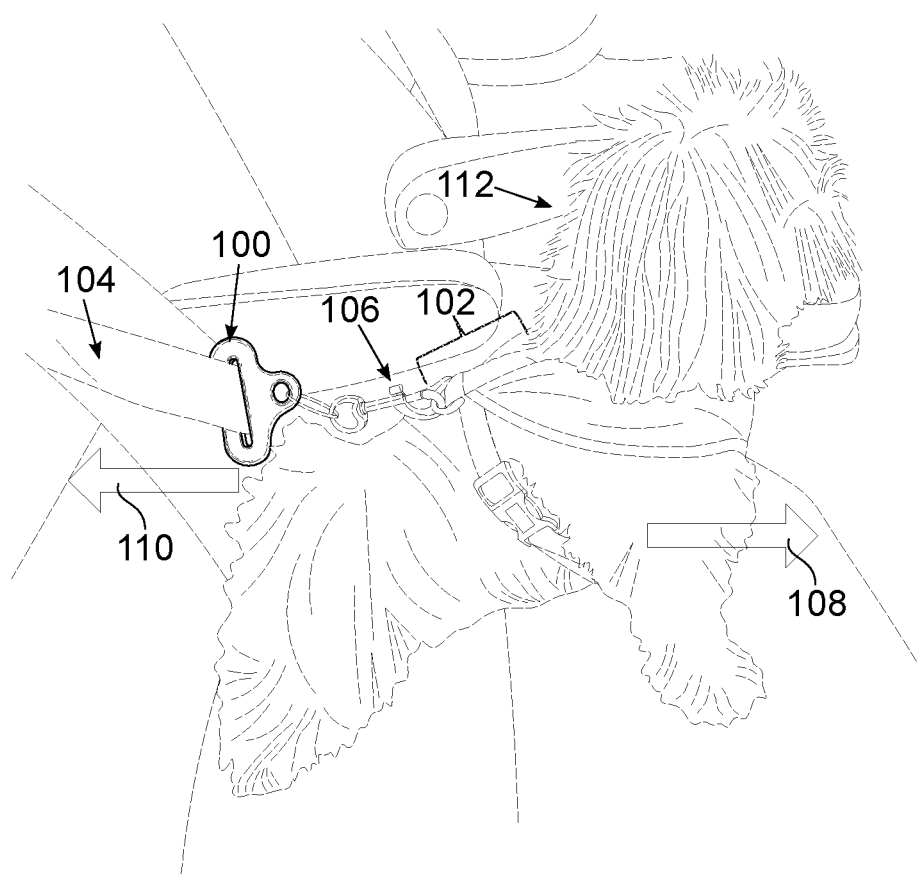
FIGS. 1A-1 to 1C-6 are non-limiting, exemplary illustration of an adapter in use with a conventional seatbelt in accordance with one or more embodiments of the present invention.

The detailed description set forth below in connection with the appended drawings is intended as a description of presently preferred embodiments of the invention and is not intended to represent the only forms in which the present invention may be constructed and or utilized.

It is to be appreciated that certain features of the invention, which are, for clarity, described in the context of separate embodiments, may also be provided in combination in a single embodiment. Conversely, various features of the invention that are, for brevity, described in the context of a single embodiment may also be provided separately or in any suitable sub-combination or as suitable in any other described embodiment of the invention. Stated otherwise, although the invention is described below in terms of various exemplary embodiments and implementations, it should be understood that the various features and aspects described in one or more of the individual embodiments are not limited in their applicability to the particular embodiment with which they are described, but instead can be applied, alone or in various combinations, to one or more of the other embodiments of the invention.

One or more embodiments of the present invention provide an adapter as part of a restraining system that is simple to manufacture and use, and allows for length adjustment of leash and or seatbelt once installed. Further, one or more embodiments of the present invention provide an adapter as part of a restraining system that appropriately secures a pet, has an appropriate mechanism to be secured to seatbelt so that it does not inadvertently disengage from the seatbelt, and allows both the pet and the individual to share the same seatbelt simultaneously. As importantly, one or more embodiments of the present invention provide an adapter as part of a restraining system that does not require the additional step of manually locking the adapter once the restraining mechanism is installed or mounted on the seatbelt.

FIGS. 1A-1 to 1A-3 are non-limiting, exemplary illustration of an adapter in use with a conventional seatbelt and a conventional leash in accordance with one or more embodiments of the present invention. As illustrated, one or more embodiments of the present invention provide a restraining system comprised of an adapter 100 that securely connects a well-known restraining mechanism (e.g., a leash) 102 to webbing 104 of a seatbelt using a well-known clasp 106, non-limiting example of which is illustrated as a scissor or round swivel snap hook. In this non-limiting, exemplary instance, adapter 100 is associated with a shoulder-strap portion of the seatbelt, but may easily be associated instead with a hip-strap portion of the seatbelt.

As further illustrated in FIGS. 1A-1 to 1A-3, as pet 112 exerts or experiences force (a forward moving force shown by arrow 108), the seatbelt will pull back in the opposite direction (shown by arrow 110) and hence, as a result of the seatbelt operating in a conventional manner, the seat occupant(s) is restrained. As best illustrated in FIG. 1A-3, adapter 100 allows both the restrained pet 112 and an individual 114 to share the same seatbelt simultaneously together without interfering with the well-known safe and normal operation of the seatbelt, including seatbelt adjustability in terms of length or when varying the length of the leash. Adapter 100 may remain on webbing 104 without interference with normal usage of the seatbelt. Accordingly, adapter 100 need not be removed, making its use very convenient.

Figures 1, 1A, 2:
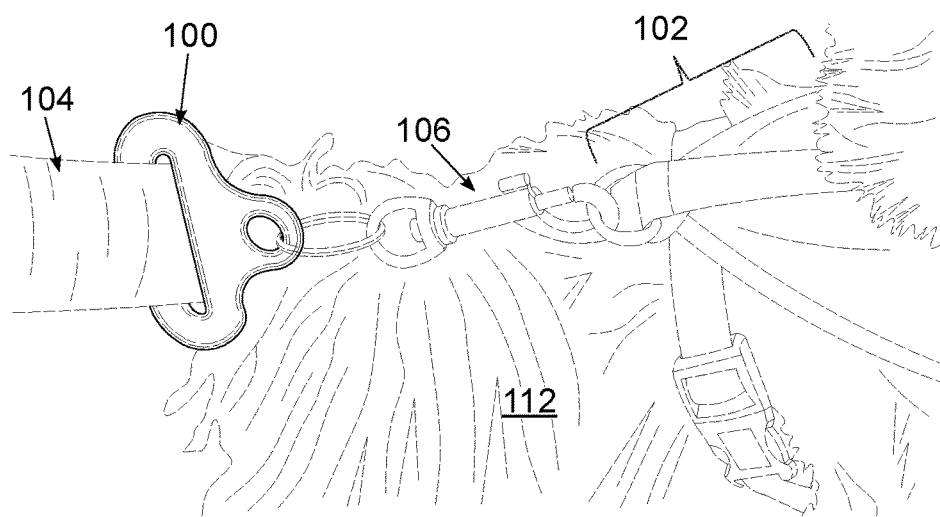
Figures 1, 1A, 2, 3:
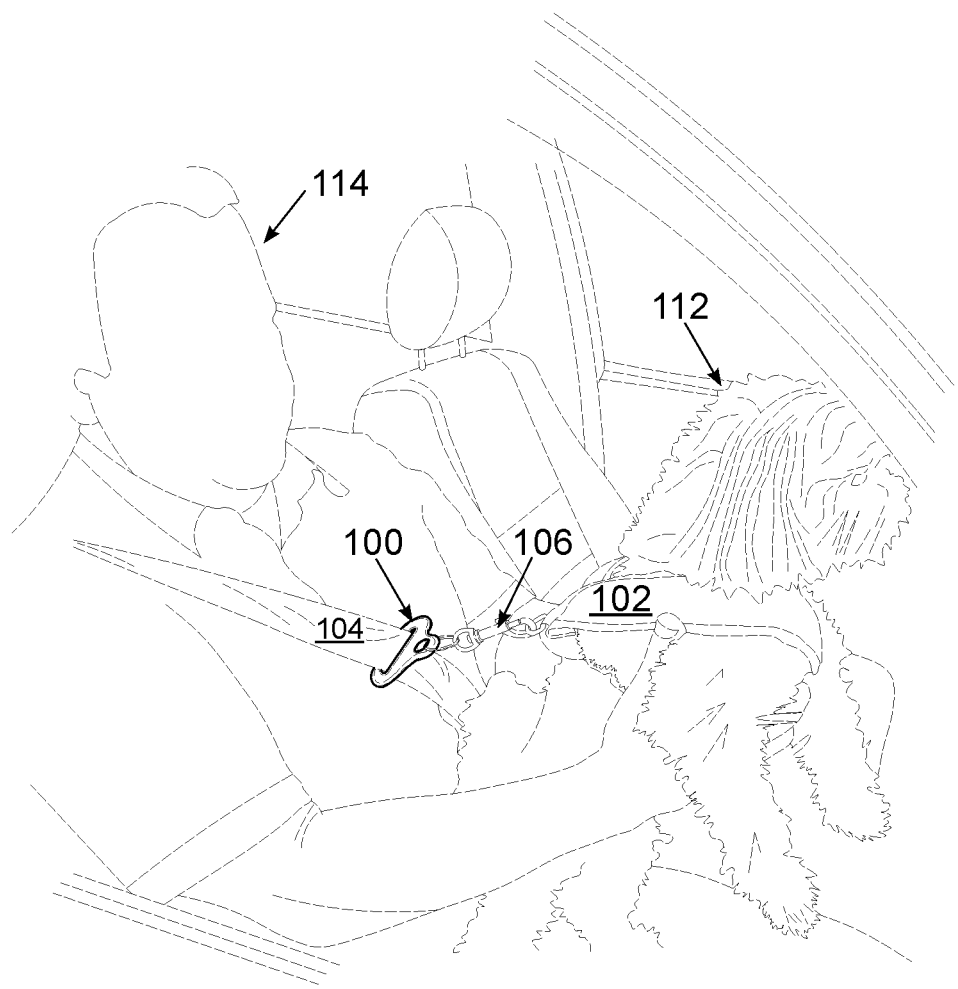
Figures 1, 1B:
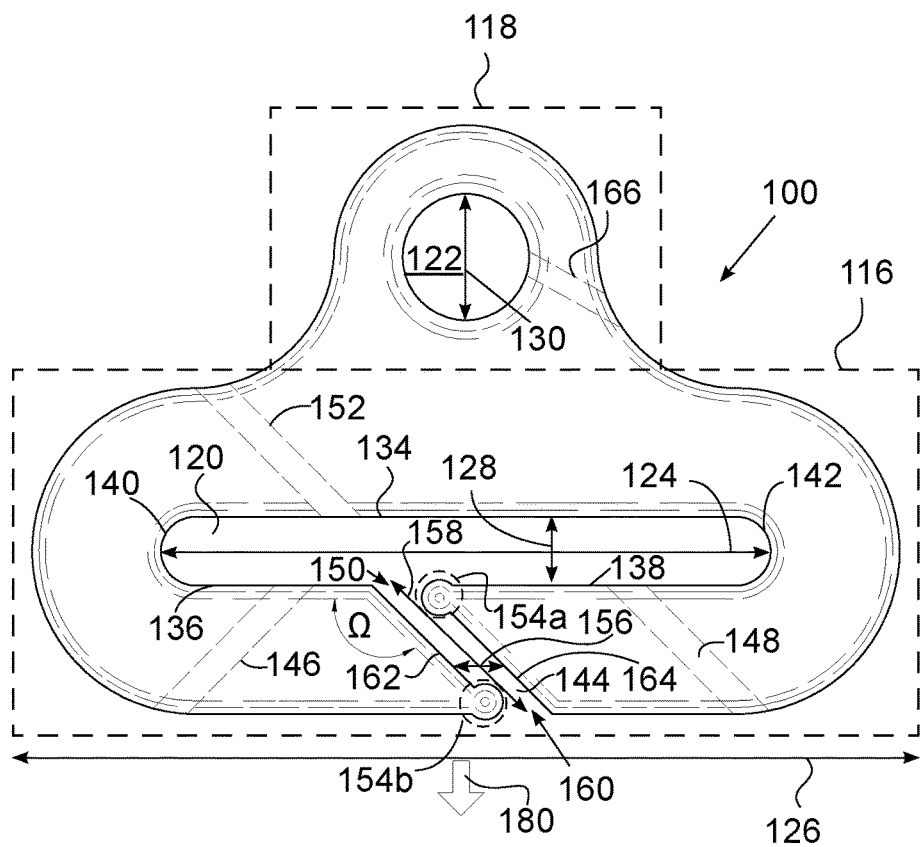
Figures 1, 1B, 2:
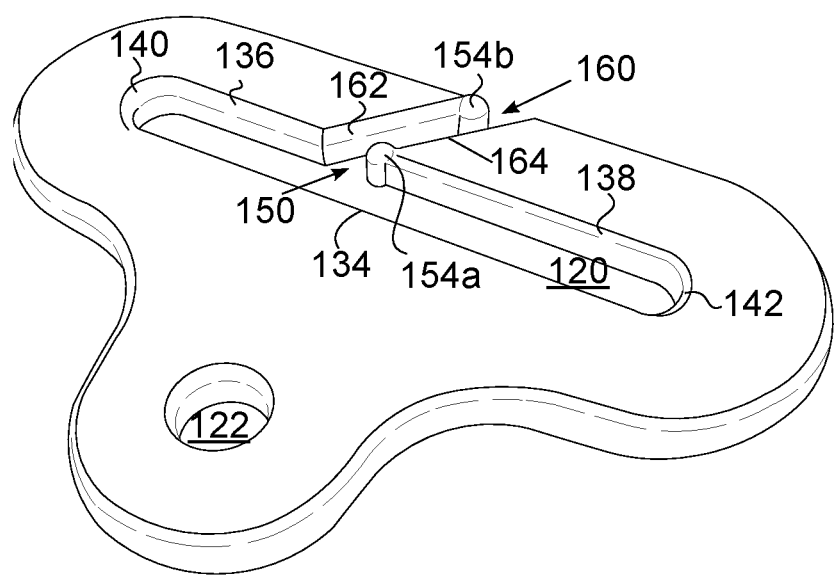
Figures 1, 1C:
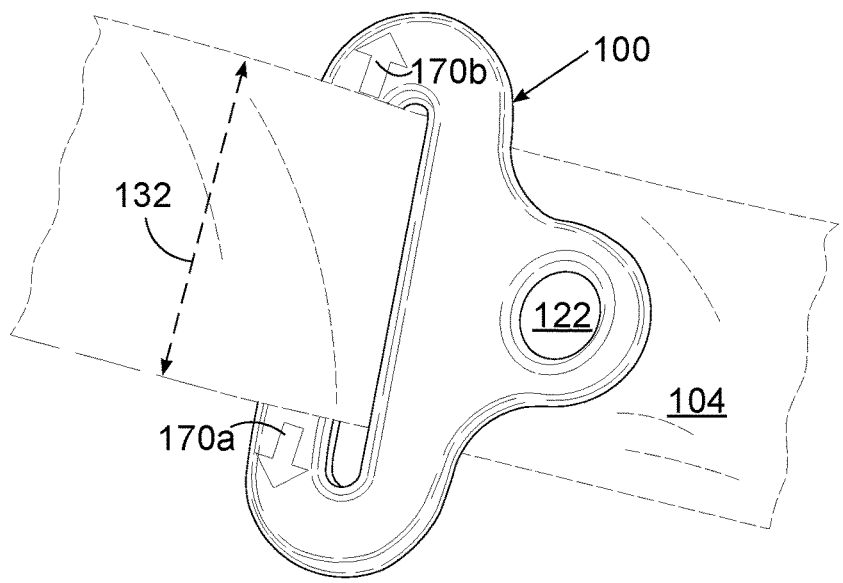
Figures 1, 1C, 2:
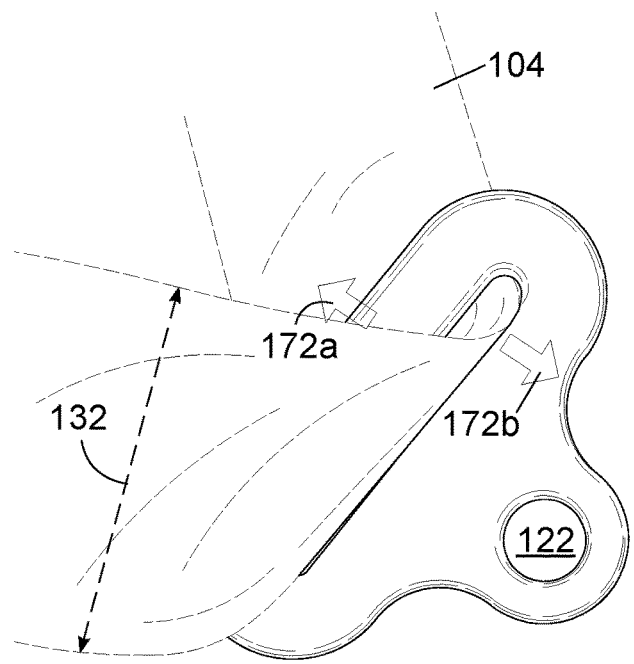
Figures 1, 1C, 2, 3:
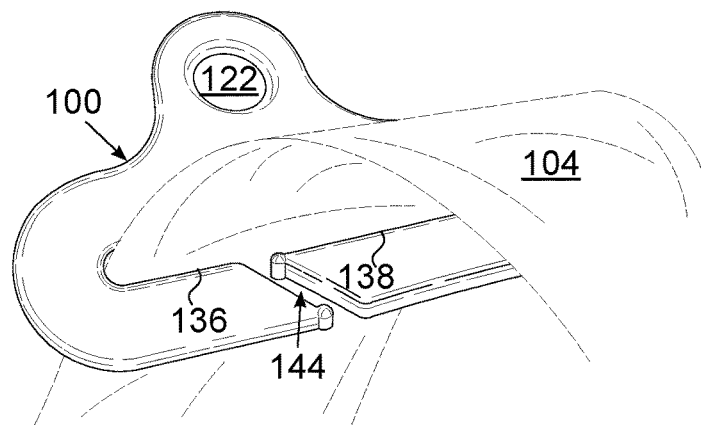
Figures 1, 1C, 2, 3, 4:
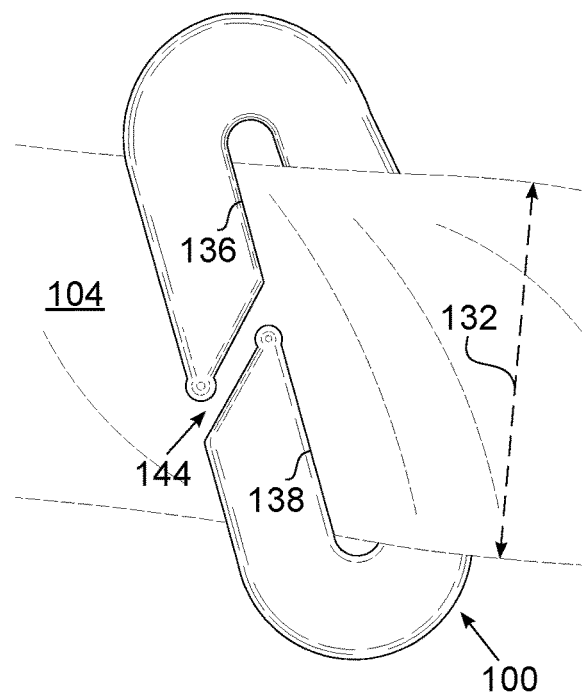

FIGS. 1B-1 and 1B-2 are non-limiting, exemplary illustrations of various views (front and back) of the adapter illustrated in FIGS. 1A-1 to 1A-3 in accordance with one or more embodiments of the present invention. As illustrated in FIGS. 1A-1 to 1B-2, adapter 100 is comprise of a single, integral piece for connecting pet restraining mechanism 102 with the seatbelt of the vehicle. Adapter 100 is comprised of a first portion 116 for engaging a seatbelt and a second portion 118 for engaging pet restraining mechanism 102 (via the illustrated clasp 106 or the like).

First portion 116 includes an elongated opening in a form of a slot 120 that receives webbing 104 of the seatbelt. Second portion 118 includes an opening 122 (an annular opening or hole) with diameter 130 for connecting adapter 100 to pet restraining mechanism 102 by the clasp 106. It should be noted that the shape of opening or hole 122 may be varied and need not be annular. Slot 120 has a slot length 124 that is oriented along a longitudinal axis 126 of first portion 116 of adapter 100, and includes a slot width 128.

Slot length 124 has a slot length span that is longer than a width 132 (FIG. 1C-1 to 1C-6) of webbing 104 of the seatbelt. In other words, slot length 124 must be of sufficient span to accommodate most types of webbings 104 with different widths. Slot width 128 has sufficient short width span to prevent rotation and turning over (or folding) of webbing 104 of seatbelt within slot 120. This will prevent adapter 100 from inadvertently sliding out and disengaging from webbing 104 through slit 144 (detailed below in relation to FIGS. 1C-1 to 1C-6). In other words, slot size must be of sufficient span to allow easy movement of webbing 104 (both laterally movement of webbing 104 and longitudinal movement of webbing 104), while preventing webbing from turning over (or folding).

Periphery of slot 120 is defined by a first longitudinal wall 134, a second longitudinal wall 136, and a third longitudinal wall 138 defining length 124 of slot 120. A first lateral wall 140 and a second lateral wall 142 further define slot width 128 of slot 120. A narrow cut in a form of a slit 144 is defined between second longitudinal wall 136 and a third longitudinal wall 138, which is used for insertion and removal of webbing 104 into the elongated opening (slot 120). Slit 144 is oriented at an angle Ω in relation to slot 120 providing an angled access to slot 120.

In general, it is preferred if slit 144 is positioned such to enable access at a generally mid-section of length 124 of slot 120. This arrangement would position slit 144 at generally mid-length section of slot 120 and mid-width section of webbing 104 of the seatbelt. The position and orientation of slit 144 prevents webbing 104 of the seatbelt from inadvertently sliding out of slot 120. Position and orientation of slit 144 prevents adapter 100 from sliding off of webbing 104 of the seatbelt, which may be a result of the pull or tug of the restrained pet. Accordingly, the combined position and orientation of slit 144 requires users to maneuver webbing of the seatbelt out of the slit 144 to detach and remove adapter 100 (detailed below in relation to FIGS. 1C-1 to 1C-6).

Additionally, orientation and position of slit 144 at a generally mid-section of length 124 of slot 120 rather than at lateral ends (at one of the lateral walls 140 or 142) provides a better structural integrity for adapter 100 in terms of structural strength where external forces are experienced the most. That is, the tug/pull force on adapter 100 is generally perpendicular (transverse) to longitudinal axis 126 of first portion 116 thereof (shown by arrow 180), which means that lateral walls 140 and 142 of slot 120 would experiences the greater tub/pull forces. Orientation and position of slit 144 at a generally mid-section of length 124 of slot 120 would enable both lateral walls 140 and 142 to together support against and absorb the tug/pull force experienced.

As shown in phantom by pair of dashed lines 146 and pair of dashed lines 148, slit 144 may optionally be positioning eccentrically (off-center) along length 124 of slot 120, but this would enable adapter 100 to more easily slide off from webbing 104, which is not preferred. When slit 144 is positioned at the generally mid-section of slot length 124 (or mid-width of webbing 104), the seatbelt cannot be removed from slit 144 (which is also positioned along width 132 of webbing 104 of the seatbelt) unless webbing 104 is intentionally maneuvered (turned so that a lateral edge 168 of webbing 104 is aligned with opening 150 of slit 144) by a user to remove and detach adapter 100 from webbing 104 of the seatbelt.

As further illustrated in phantom (pair of dashed lines 152), slit 144 may also be instead positioned and oriented along either side of second portion 118, but away from lateral walls 140 and 142 of slot 120. Slit 144 need not be at an angle, but may be oriented perpendicular to slot 120 but angled access to slot 120 is preferred as such an arrangement makes it less possible for adapter 100 to inadvertently slide off of webbing 104. Finally, opening or hole 122 of second portion 118 for connecting pet restraining mechanism 102 may optionally also include a slit 166 (shown in phantom as a pair of dashed lines 166) for easier assembly of an O-ring of clasp 106.

Slit 144 may optionally include one or more impediment 154a/b in a form of protuberances for preventing inadvertent egress of webbing 104 of the seatbelt from elongated opening (slot 120) and slit 144. In other words, protuberances (e.g., impediments 154a/b) further narrow a width 156 of slit 144 along slit length 158 between first and second openings 150 and 160 of slit 144. This arrangement makes it even less possible for adapter 100 to inadvertently slide off of webbing 104.

It should be noted that instead of protuberances, the passageway defined by slit 144 (i.e., the slit 144 itself) may be curved or tortuous and hence, act as impediment to block or prevent inadvertent egress of webbing 104 of the seatbelt from slot 120. The position of protuberances may be along any part of slit passageway and need not be at distal ends thereof as shown. Further, the number of protuberances need not be equal along walls or peripheries that define slit 144. In other words, for example, first wall 162 of slit 144 may have a single protuberance at a generally mid-section, whereas second wall 164 of slit 144 may have two protuberance at both distal ends thereof, etc.

FIGS. 1C-1 to 1C-6 are non-limiting, exemplary illustrations of one or more enlarged views of the adapter and seatbelt webbing combination, including progressively illustrating a non-limiting, exemplary method of mounting/removal of the adapter onto or from a webbing of the seatbelt in accordance with one or more embodiments of the present invention. As illustrated in FIGS. 1A-1 to 1C-6, and shown by arrows 170a/b in FIG. 1C-1, slot length 124 has sufficient length span to enable free lateral movement of webbing 104, and has sufficient width span to enable free movement along a width direction (shown by arrows 172a/b in FIG. 1C-2). As best illustrated in FIGS. 1C-3 and 1C-4, slit 144 is generally oriented and positioned at a mid-length section of slot 120 and at a generally mid-width section of webbing 104, which would prevent inadvertent sliding off of adapter 100 from webbing 104.

As best illustrated in FIGS. 1C-5 and 1C-6, webbing 104 may be moved out of slot 120 (and hence, detaching adapter 100 from seatbelt) in a very easy and intuitive manner by first moving webbing 104 laterally within slot 120 as shown by arrow 176, folding webbing 104 and aligning a lateral edge 168 of webbing 104 with opening 150, and passing lateral edge 168 through slit 144 as shown in FIGS. 1C-5 and out of slit 144 as shown in FIG. 1C-6 by arrow 178.

Inserting webbing 104 into slot 120 (and hence, mounting adapter 100 onto seatbelt) is also easy and intuitive by first aligning lateral edge 168 of webbing with opening 160, and inserting lateral edge 168 of webbing 104 through opening 160 and passed through slit 144 and out of opening 150 and into slot 120. Thereafter, moving webbing 104 laterally within slot 120 while pulling a trailing edge of webbing 104 out of slit 144 and releasing trailing lateral edge into slot 120. It should be noted that once mounted, adapter 100 does not require the additional step of manually locking with webbing 104 of seatbelt. Further, adapter 100 need not be removed, as it will not affect normal use and safe operation of the seatbelt.

Figures 1, 1C, 2, 3, 4, 5:
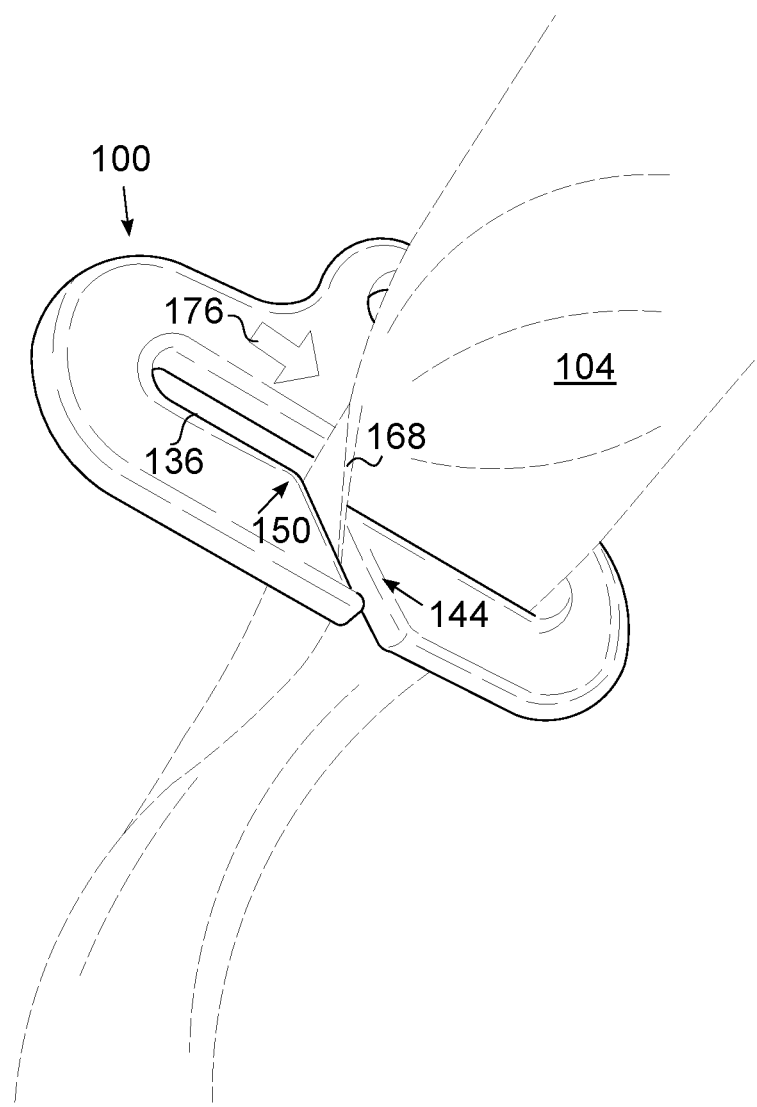
Figures 1, 1C, 2, 3, 4, 5, 6:
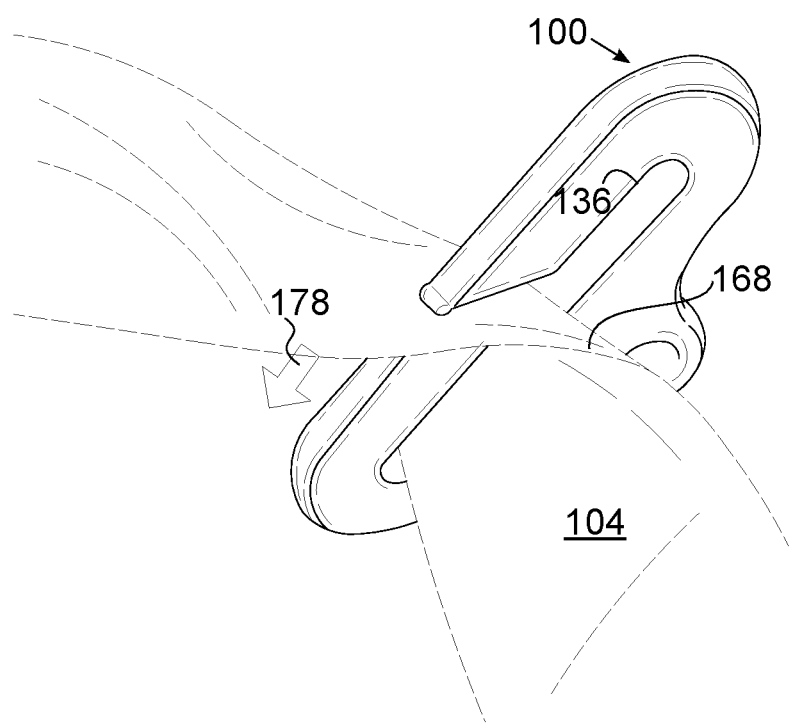
Figures 1, 2A:
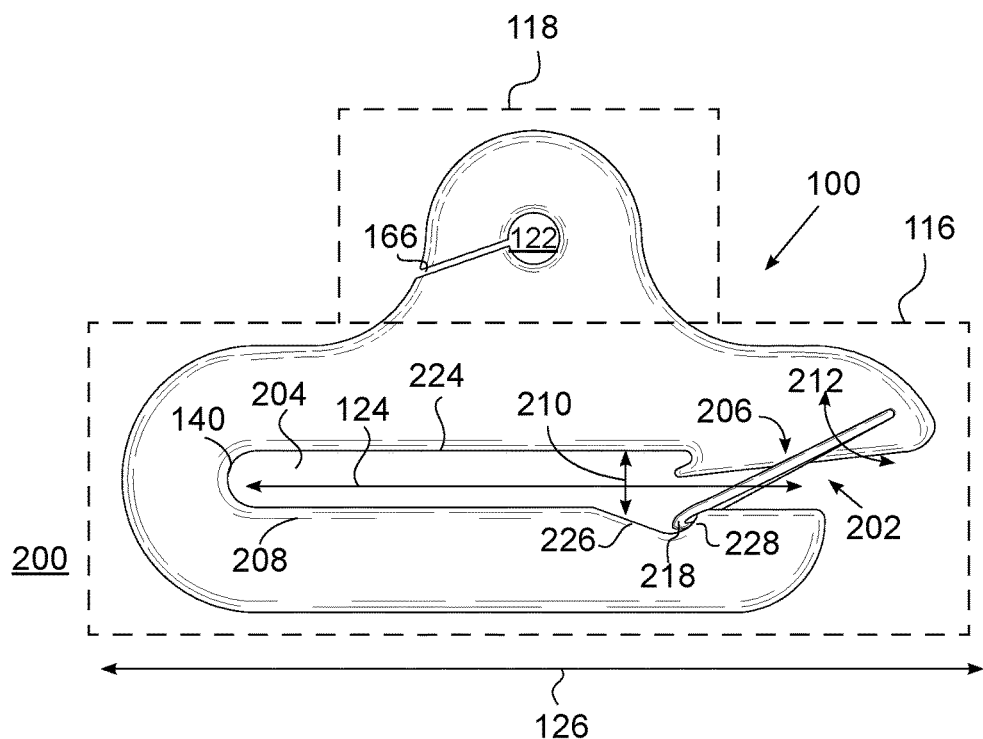
Figures 2, 2A:
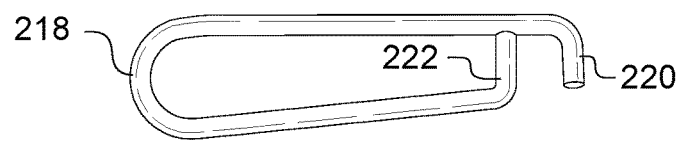
Figure 2B:
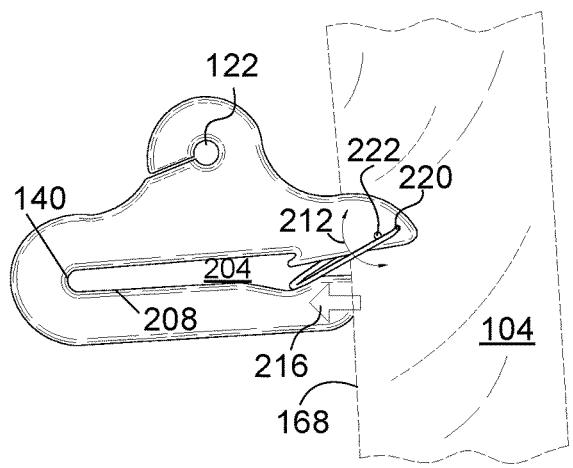
Figure 2C:
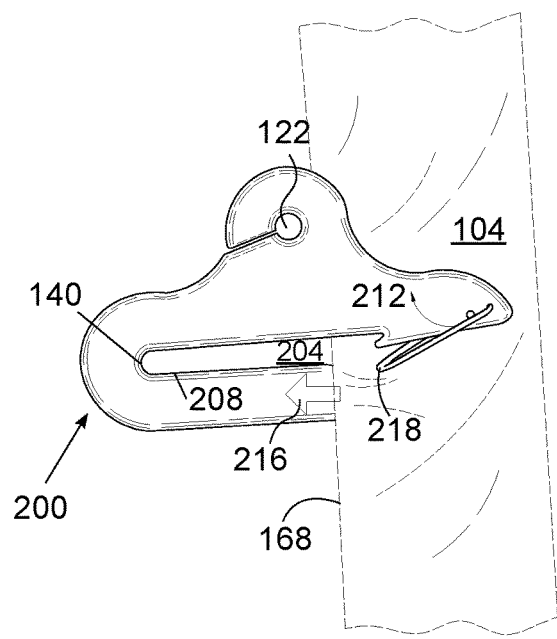
Figure 2D:
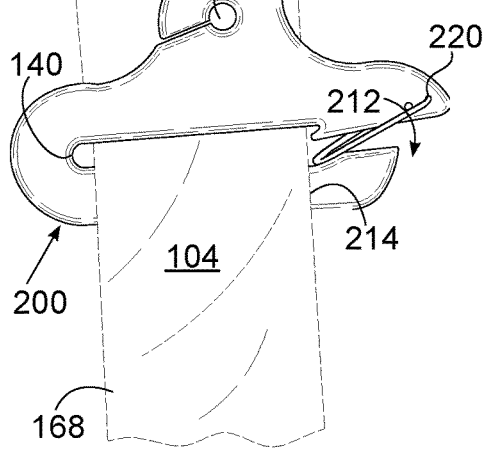

FIGS. 2A-1 to 2D are non-limiting, exemplary illustration of an adapter in use with a conventional seatbelt in accordance with one or more embodiments of the present invention. Adapter 200 illustrated in FIGS. 2A-1 to 2D includes similar corresponding or equivalent components, interconnections, functional, operational, and or cooperative relationships as adapter 100 that is shown in FIGS. 1A-1 to 1C-6, and described above. Therefore, for the sake of brevity, clarity, convenience, and to avoid duplication, the general description of FIGS. 2A-1 to 2D will not repeat every corresponding or equivalent component, interconnections, functional, operational, and or cooperative relationships that has already been described above in relation to adapter 100 that is shown in FIGS. 1A-1 to 1C-6.

As illustrated in FIGS. 2A-1 to 2D, adapter 200 includes first portion 116 that has lateral access opening 202 with an added entry gate or lock 206 into slot 204. This non-limiting, exemplary arrangement allows easier engagement/disengagement of adapter 200 with the seatbelt. As best illustrated in FIGS. 2B to 2D, slot 204 has lateral opening 202 to enable sliding-insertion and removal of webbing 104 of the seatbelt without folding, bending, or crimping (pleat or pinch) webbing 104 and further, without having to pass through a tortuous path or one that has impediments.

As illustrated in FIGS. 2B to 2D, to insert webbing 104 through lateral opening 202 and into slot 204, lateral access opening 202 of adapter 200 is first aligned with lateral edge 168 of webbing 104 of the seatbelt. Thereafter, webbing 104 is slid into slot 204 along path shown by arrow 216 as illustrated in FIGS. 2B and 2C. Lateral edge 168 of webbing 104 would push away gate 206 along a non-linear reciprocating path 212, with free end 218 of gate 206 sliding over webbing 104 (FIG. 2C) until the entire width 132 of webbing 104 is fully inserted into slot 204. Gate 206 is a resilient member biased to a closed position as shown in FIG. 2A and hence, snaps back to its default closed position due to spring action once a trailing lateral edge 214 of webbing 104 clears free end 218 of gate 206. Closure of gate 206 prevents removal of webbing 104 unless user manually opens gate 206.

In this non-limiting, exemplary instance, gate 206 is comprised of a resilient member in a form of well-known spring-clip, a non-limiting example of which is shown in FIG. 2A-2. Spring-clip 206 is comprised of two anchoring ends 220 and 222 that are anchored to two sides (front and back) of first portion 116 of adapter 100 (above the lateral opening 202) at anchor points that are not axial aligned because anchoring ends 220 and 222 are eccentric (non-aligned) in relation to each other as best shown in FIG. 2A-2 (i.e., anchoring ends 220 and 222 form off-axis pivot points).

In this non-limiting, exemplary embodiment first longitudinal wall 224, lateral wall 140, second longitudinal wall 208, and lateral access opening 202 may define periphery of slot 204. The first and the second longitudinal walls 224 and 208 of slot 204 may be equal in size (e.g., length, width, thickness, or other dimensions, etc.) and need not be different as illustrated where second longitudinal wall 208 is illustrated as being shorter than first longitudinal wall 224.

Further, slot width 210 is generally constant throughout length 124 of slot 204, but varies near lateral access opening 202 to define a carved out portion 226 on second longitudinal wall 208. Free end 218 of gate 206 rests within carved-out portion (dent, indentation, dip, depression, etc.) 226 near lateral opening 202. The dip 226 prevents lateral edge 214 of webbing 104 of the seatbelt from inadvertently to wedge between second longitudinal wall 208 and free end 218 of gate 206 and slide out of slot 204. In other words, lateral edge 214 of webbing 104 of the seatbelt will remain above the depression or indentation 226, away from and above free end 218 of gate 206. Carved-out portion 226 on second longitudinal wall 208 forms an indentation, dip, depression rather than a straight edge near lateral opening 202, which also defines a barrier 228, which would further block lateral edge 214 of webbing 104 of the seatbelt if it is inadvertently wedged out from under free end 218 of gate 206.

FIGS. 3A to 3E are non-limiting, exemplary illustration of an adapter in use with a conventional seatbelt in accordance with one or more embodiments of the present invention. Adapter 300 illustrated in FIGS. 3A to 3E includes similar corresponding or equivalent components, interconnections, functional, operational, and or cooperative relationships as adapters 100 and 200 that are shown in FIGS. 1A-1 to 2D, and described above. Therefore, for the sake of brevity, clarity, convenience, and to avoid duplication, the general description of FIGS. 3A to 3E will not repeat every corresponding or equivalent component, interconnections, functional, operational, and or cooperative relationships that has already been described above in relation to adapters 100 and 200 that are shown in FIGS. 1A-1 to 2D.

As illustrated in FIGS. 3A to 3E, in this non-limiting, exemplary embodiment, adapter 300 includes gate 206 with anchoring ends 220 and 222 connected to a second longitudinal wall 308 of slot 304, below lateral access opening 202. In this non-limiting, exemplary embodiment first longitudinal wall 306, lateral wall 140, second longitudinal wall 308, and lateral access opening 202 define periphery of slot 304. Further, carved out portion 226 and barrier 228 are positioned on first longitudinal wall 306 instead, which means that free end 218 of gate 206 rests within carved-out portion (dent, indentation, dip, depression, etc.) 226 near and above lateral opening 202.

Figure 3A:
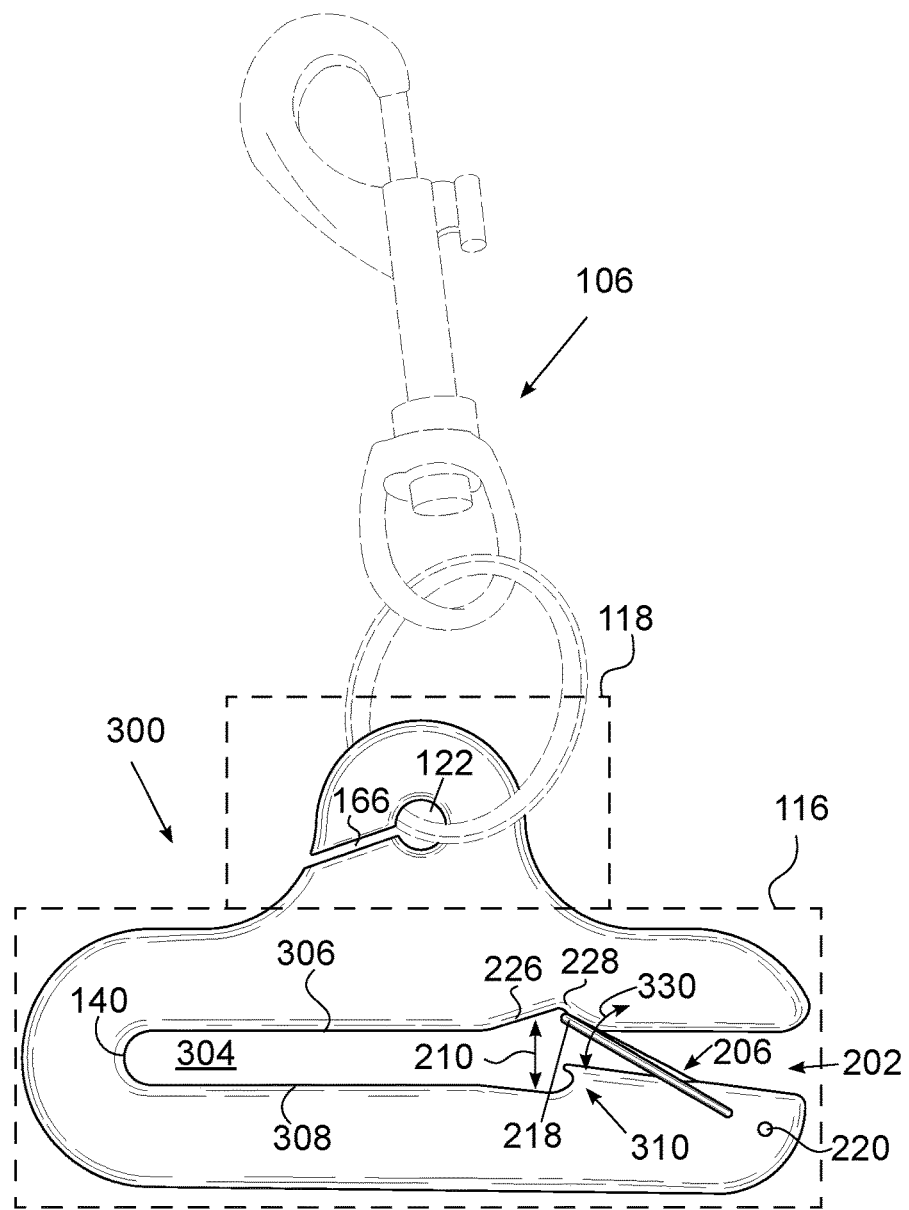
FIGS. 3A to 3E are non-limiting, exemplary illustration of an adapter in use with a conventional seatbelt in accordance with one or more embodiments of the present invention.
Figure 3B:
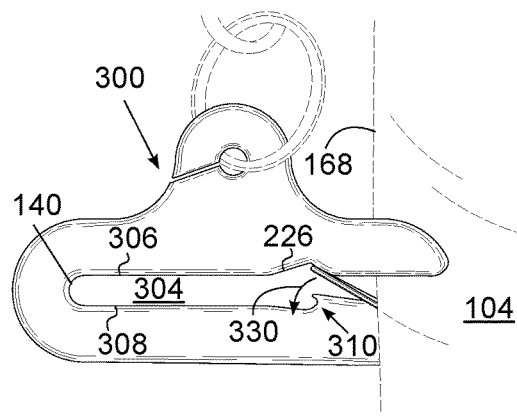
Figures 1, 3C:
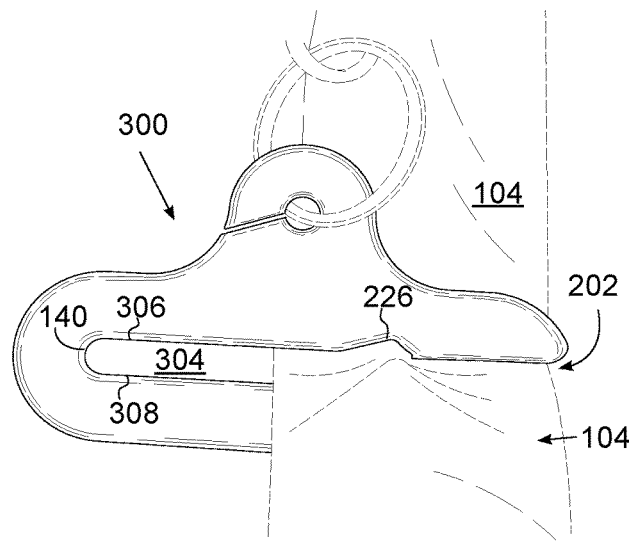
Figures 2, 3C:
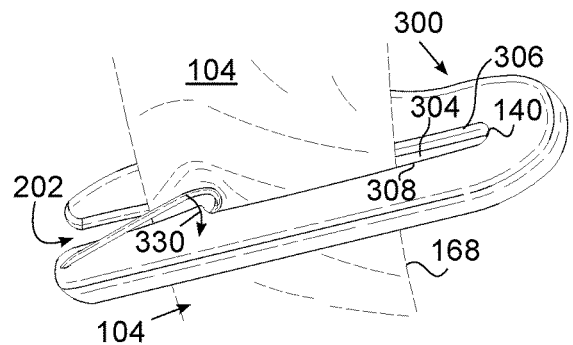
Figure 3D:
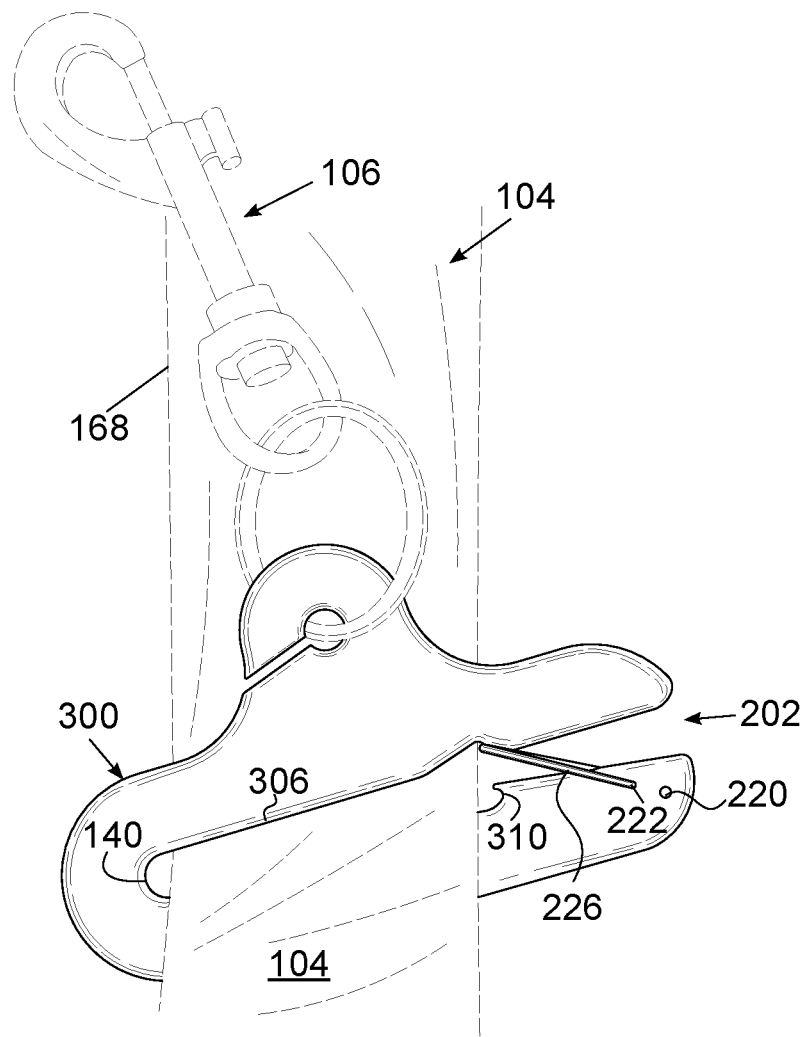
Figure 3E:
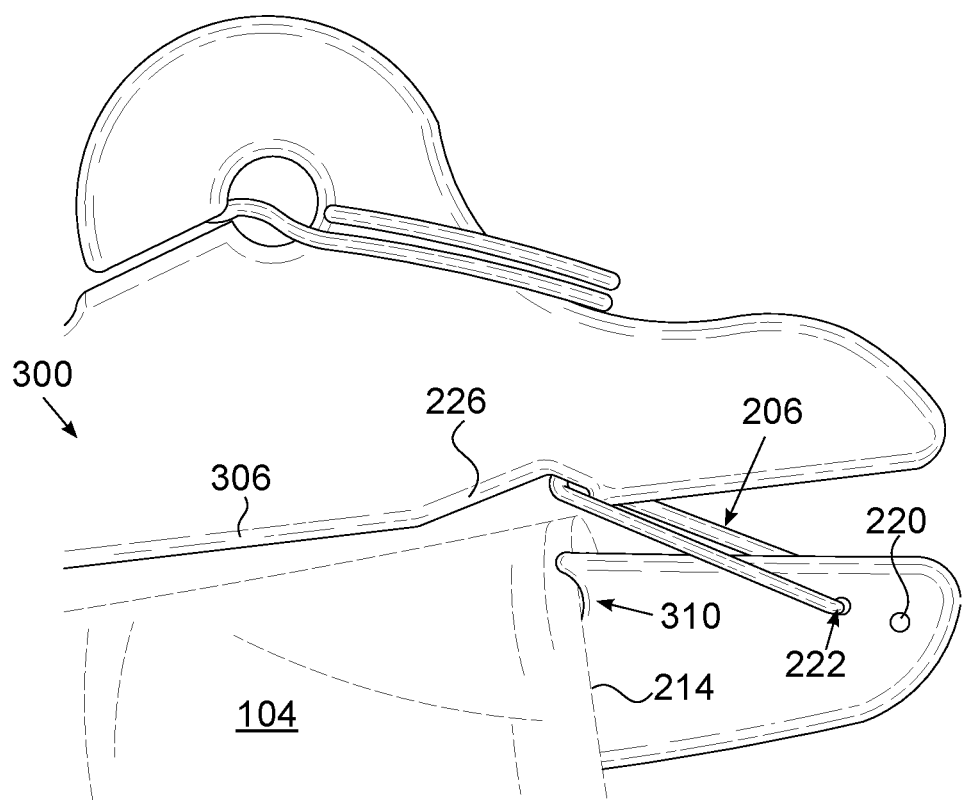

Additionally, in this non-limiting exemplary embodiment, second longitudinal wall 308 includes an additional barrier 310 that maintains webbing 104 away from lateral opening 202 (and in particular, away from gate 106), best illustrated in FIG. 3E. When adapter 300 is tugged by restraining mechanism 102, webbing 104 of the seatbelt is pulled against barrier 310 (best shown in FIG. 3E), with lateral edge 214 of webbing 104 blocked from moving further towards opening 202 by barrier 310 before webbing 104 reaches gate 206. This protects gate 206 (and in particular, anchoring ends 220 and 220) from experiencing the tug/pull force from restraining mechanism 102.

It should be noted that such a barrier 310 in the previous embodiment (adapter 200) where anchoring ends 220 and 222 of gate 206 were on first longitudinal wall 224 above the lateral opening 202 was not necessary because webbing 104 does not pull against first longitudinal wall 224 or 306 of either embodiments (adapters 200 or 300) due to the tug/pull force of restraining mechanism 102, but only second longitudinal wall 208 or 308 of both respective embodiments adapters 200 and 300. FIGS. 3B to 3E are non-limiting, exemplary illustrations of one or more views of adapter 300 and seatbelt webbing combination, including progressively illustrating a non-limiting, exemplary method of mounting/removal of the adapter onto or from a webbing of the seatbelt, which is similar to that shown and described in relation to FIGS. 2A-1 to 2D. In this non-limiting exemplary embodiment, free end 218 of gate 206 moves along a non-linear reciprocation path shown by arrow 330 to block or enable access to slot 304.

Figure 4A:
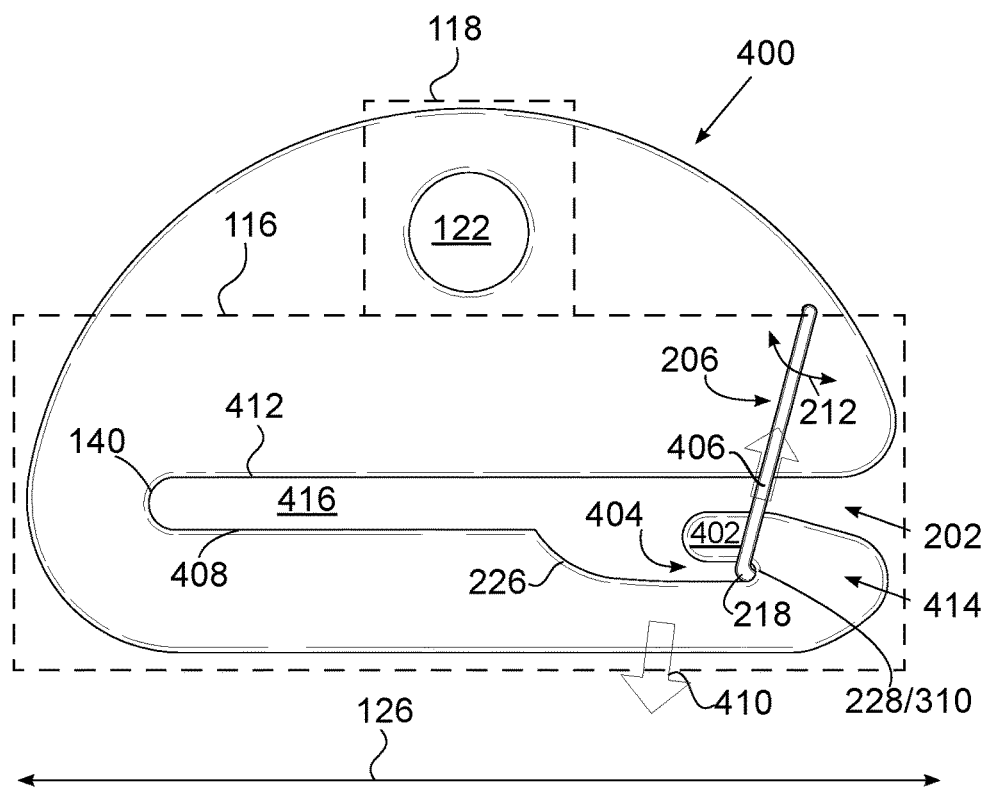
Figures 1, 4B:
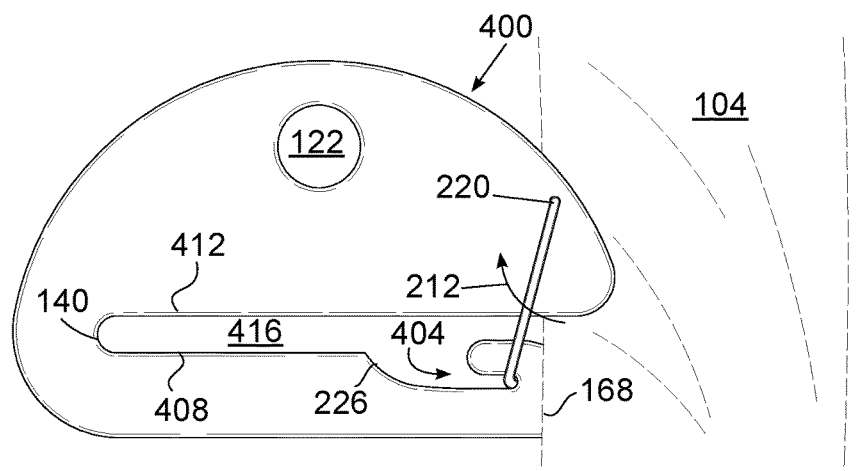
Figures 2, 4B:
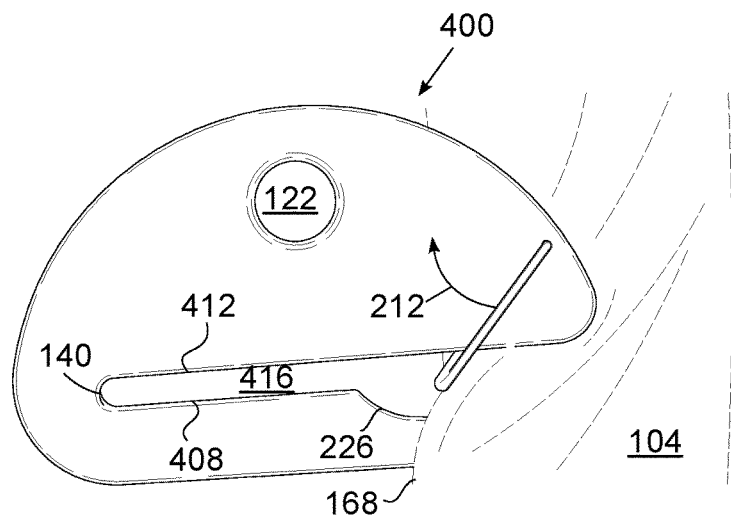
Figures 3, 4B:
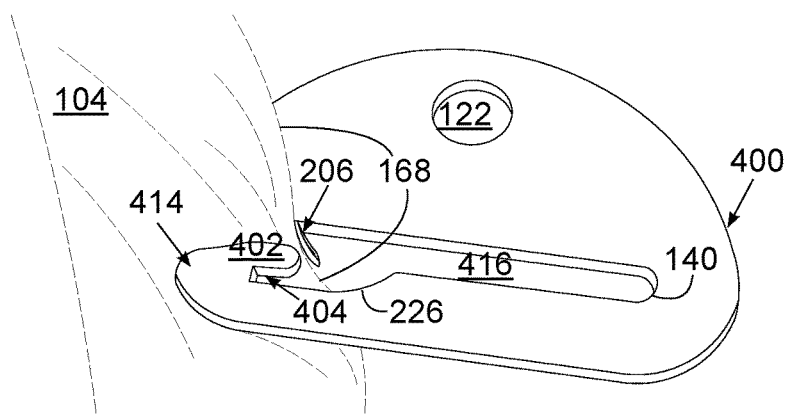
Figures 4, 4B:
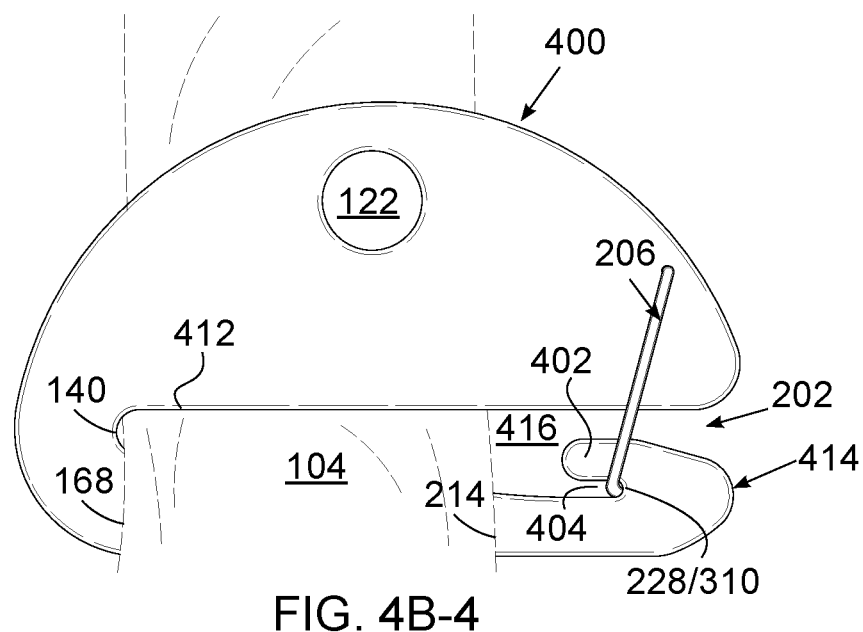
Figures 4, 4B, 5:
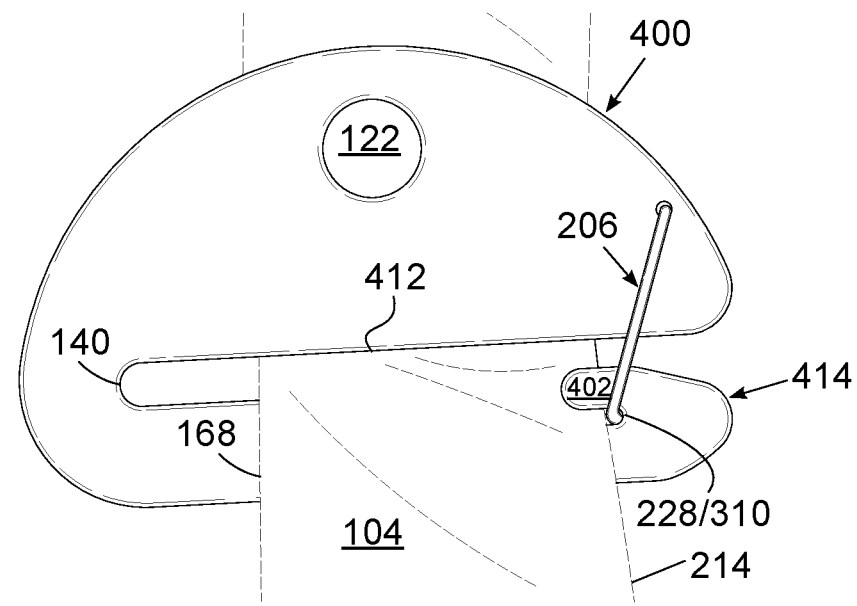

FIGS. 4A to 4B-5 are non-limiting, exemplary illustration of an adapter in use with a conventional seatbelt in accordance with one or more embodiments of the present invention. Adapter 400 illustrated in FIGS. 4A to 4B-5 includes similar corresponding or equivalent components, interconnections, functional, operational, and or cooperative relationships as adapters 100, 200, and 300 that are shown in FIGS. 1A-1 to 3E, and described above. Therefore, for the sake of brevity, clarity, convenience, and to avoid duplication, the general description of FIGS. 4A to 4B-5 will not repeat every corresponding or equivalent component, interconnections, functional, operational, and or cooperative relationships that has already been described above in relation to adapters 100, 200, and 300 that are shown in FIGS. 1A-1 to 3E.

As illustrated in FIGS. 4A to 4B-5, in this non-limiting, exemplary embodiment, free end 218 of gate 206 is detachably or removeably lodged or wedged within a cavity 404 under a flange (tab or hook) 402. Further, gate 206 is oriented generally vertically (generally transverse longitudinal axis 126 of first portion 116) to provide adequate and appropriate support for second longitudinal wall 408 of first portion 116.

In this non-limiting, exemplary embodiment, gate 206 operates as both a gate for slot 416 and also as support structure that counters tug/pull forces experienced by second longitudinal wall 408 from restraining mechanism 102. In other words, gate 206 prevents second longitudinal wall 408 from being pulled away from first longitudinal wall 412 in the direction shown by arrow 410 as a result of the pull of the seatbelt. Stated otherwise, tugging or pulling action from restraining mechanism 102 will not be translated into a torque action at lateral wall 140 where free end 414 of second longitudinal wall 408 would operate as a lever to put a torque on the integral end (lateral wall 140). Gate 206 would provide a counter acting force shown by arrow 406 to the pulling force of seatbelt shown by arrow 410. Cavity 404 under flange (tab or hook) 402 provides the same functionality as barrier 228 and 310.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Further, the specification is not confined to the disclosed embodiments. Therefore, while exemplary illustrative embodiments of the invention have been described, numerous variations and alternative embodiments will occur to those skilled in the art. For example, outer periphery (i.e., silhouette) of the any one or more of the illustrated adapter may have different shapes. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:

1. A device, comprising:
a single piece adapter that detachably connects a restraining mechanism to a seatbelt of a vehicle, with the seatbelt comprising a webbing;
the adapter having a top outer edge, bottom outer edges, and lateral outer edges;
the adapter is comprised of:
a longitudinally extending first portion with generally symmetrical and continuously closed transversely oriented load bearing lateral sections that generally evenly distribute load at the generally symmetrical load bearing closed lateral sections, with the load resulting from externally applied forces;
the generally symmetrical load bearing closed lateral sections are defined by a central transverse axis of the adapter;
a longitudinally extending elongated opening within the first portion that is oriented parallel to and extends along a longitudinal axis of the adapter that detachably receives the webbing of the seatbelt;
the elongated opening is defined by the generally symmetrical load bearing closed lateral sections that include load bearing inner lateral walls and the lateral outer edges of the adapter;
the elongated opening is further defined by a first inner longitudinal wall, a second inner longitudinal wall, and a third inner longitudinal wall, with the first, second, and third inner longitudinal wall linearly extend longitudinally, parallel along the longitudinal axis of the adapter, defining a length of the elongated opening;
the first inner longitudinal wall is continuous and has a first length that is longer than a second length of the second inner longitudinal wall and a third length of the third inner longitudinal wall;
the second and the third inner longitudinal walls are aligned and oriented to extend parallel to the first inner longitudinal wall, extending from opposite lateral sections of the adapter along the longitudinal axis of the adapter;
a first distal end of the second longitudinal wall and a first distal end of the third longitudinal wall are free, forming a narrow cut in a form of a slit for insertion and removal of the webbing into the elongated opening;
the slit is oriented at an angle in relation to the elongated opening, providing an angled access to the elongated opening;
the slit includes a first opening that leads into a generally mid-length section of the elongated opening, a second opening at the bottom outer edges that leads into the slit and is generally aligned with the generally mid-length section of the elongated opening, and a plurality of protuberances projecting into the slit from opposing sides of the slit;
the adapter is further comprised of a second portion having:
the top edge that comprises generally rounded outer periphery with generally symmetrical lateral shoulders that includes:
a generally rounded hole adjacent the top edge, between the generally symmetrical lateral shoulders that detachably connects the restraining mechanism with the adapter, with the rounded hole realigning directions of applied forces from the restraining mechanism and webbing generally with the central transverse axis of the adapter to generally evenly distribute load at the closed lateral sections.

2. The device as set forth in claim 1, wherein:
the adapter is maintained on the webbing without interference with usage of the seatbelt.

3. The device as set forth in claim 1, wherein:
the adapter is associated with one of a shoulder-strap portion of the webbing of the seatbelt and a hip-strap portion of the webbing of the seatbelt.

4. The device as set forth in claim 1, wherein:
the restraining mechanism is a leash that is connected to the adapter by a clasp.

5. The device as set forth in claim 1, wherein:
the elongated opening includes:
an elongated opening length with an elongated opening span that is longer than a width of the webbing of the seatbelt; and
an elongated opening width that is sufficiently short to prevent rotation and turning over of the webbing of the seatbelt within the elongated opening.

6. The device as set forth in claim 1, wherein:
the slit includes one or more impediment in a form of protuberances for preventing inadvertent egress of the webbing of the seatbelt from the elongated opening and the slit.

7. The device as set forth in claim 1, wherein:
the slit is positioned along a length of the elongated opening.

8. A device, comprising:
an adapter that detachably connects a restraining mechanism with a seatbelt of a vehicle, with the seatbelt comprising a webbing;
the adapter is comprised of:
generally symmetrical closed lateral sections defined by a central transverse axis of the adapter;
a longitudinally extending first portion includes the generally symmetrical closed lateral sections that detachably engage the seatbelt and a second portion with generally symmetrical lateral portions that detachably engages the restraining mechanism;
the first portion includes:
a longitudinally extending elongated opening that detachably receives the webbing of the seatbelt;
lateral ends of the elongated opening are defined by the closed lateral sections;
the closed lateral section include load bearing inner lateral walls and lateral outer edges of the adapter;
the elongated opening is further defined by a first inner longitudinal wall, a second inner longitudinal wall, and a third inner longitudinal wall, with the first, second, and third inner longitudinal wall linearly extend longitudinally, parallel along the longitudinal axis of the adapter, defining a length of the elongated opening;

the first inner longitudinal wall is continuous and has a first length that is longer than a second length of the second inner longitudinal wall and a third length of the third inner longitudinal wall;

the second and the third inner longitudinal walls are aligned and oriented to extend parallel to the first inner longitudinal wall, extending from opposite lateral sections of the adapter along the longitudinal axis of the adapter;

a first distal end of the second longitudinal wall and a first distal end of the third longitudinal wall are free, a narrow cut in a form of a slit oriented at an angle in relation to the elongated opening, with the slit including a first opening that leads into a generally mid-length section of the elongated opening, a second opening at bottom edges of the adapter that leads into the slit and is generally aligned with the generally mid-length section of the elongated opening, and a plurality of protuberances projecting into the slit from opposing sides of the slit; and the second portion includes:

a generally rounded outer periphery with generally symmetrical lateral shoulders that define the generally symmetrical lateral portions including:

a generally rounded hole adjacent a top edge of the generally rounded outer periphery of the adapter and positioned between the generally symmetrical lateral shoulders that detachably connects the restraining mechanism;

with rounded hole realigning directions of applied forces generally with the central transverse axis of the adapter to mostly evenly distribute load at the closed lateral sections of the first portion.

9. The device as set forth in claim 8, wherein:
the elongated opening has length that is oriented along a longitudinal axis of the first portion of the adapter; and width.

10. The device as set forth in claim 9, wherein:
the length has a span that is longer than a width of the webbing of the seatbelt; and
the width is sufficiently short to prevent rotation and turning over of the webbing of the seatbelt within the elongated opening.

11. The device as set forth in claim 8, wherein:
the elongated opening is defined by:
a longitudinal periphery defining the length of the elongated opening; and
a transverse periphery that define the width of the elongated opening.

12. A device, comprising:
a single piece adapter comprised of:
a longitudinally extending first portion with generally symmetrical and continuously closed transversely oriented load bearing, closed lateral sections defined by a central transverse axis of the adapter;

the symmetrical lateral sections enable generally even distribution of load at the closed lateral sections, with the load resulting from externally applied forces;

the first portion includes:

a longitudinally extending elongated opening that is oriented parallel to and extends along a longitudinal axis of the adapter the elongated opening is defined by the generally symmetrical, load bearing, closed lateral sections that include load bearing inner lateral walls and load bearing lateral outer edges of the adapter;

the elongated opening is further defined by a first inner longitudinal wall, a second inner longitudinal wall, and a third inner longitudinal wall, with the first, second, and third inner longitudinal wall linearly extend longitudinally, parallel along the longitudinal axis of the adapter, defining a length of the elongated opening;

the first inner longitudinal wall is continuous and has a first length that is longer than a second length of the second inner longitudinal wall and a third length of the third inner longitudinal wall;

the second and the third inner longitudinal walls are aligned and oriented to extend parallel to the first inner longitudinal wall, extending from opposite lateral sections of the adapter along the longitudinal axis of the adapter;

a narrow cut in a form of a slit oriented at an angle in relation to the elongated opening, with the slit including a first opening that leads into a generally mid-length section of the elongated opening, a second opening in between the second and the third inner longitudinal walls that leads into the slit and is generally aligned with the generally mid-length section of the elongated opening, and a plurality of protuberances projecting into the slit from opposing sides of the slit;

the adapter is further comprised of:

a second portion with generally symmetrical lateral portions that include a generally rounded hole in between the symmetrical lateral portions that realigns directions of applied forces generally with a central transverse axis of the adapter to mainly evenly distribute load at the closed lateral sections of the first portion.

* * * * *